United States Patent Office 3,345,346
Patented Oct. 3, 1967

3,345,346
AMINOPOLYMER COMPOSITIONS
Delbert D. Reynolds, Rochester, N.Y., assignor to Eastman Kodak Company, Rochester, N.Y., a corporation of New Jersey
No Drawing. Filed Apr. 15, 1965, Ser. No. 448,264
16 Claims. (Cl. 260—79.3)

This invention relates to a new class of polymers and their quaternization products, and to a process for preparing these polymers and their quaternary salts.

It is reported in the literature, such for example as in an article by McLeod and Robinson, J. Chem. Soc, 119, 1470 (1921), that alkoxymethylamines are readily and cheaply prepared from secondary amines, formaldehyde, and alcohols according to the following equation:

$$R_1R_2NH + CH_2O + R'OH \rightarrow R_1R_2NCH_2OR' + H_2O.$$

By variation of $R_1$ and $R_2$ in the above formulas, i.e., by use of various secondary amines, it is therefore possible to produce a large variety of such compounds.

It is an object of the present invention to take advantage of the ease and economy of this process for the preparation of alkoxymethylamines and, from them, to provide a new and valuable class of polymers and their quaternization products and methods for their production.

Other objects and advantages of this invention will be apparent from the following description.

It has been discovered, according to this invention, that a new class of polymers may be prepared by reacting N,N-di-substituted alkoxymethylamines with polyvinyl alcohol and that the resulting novel polymers, which contain tertiary amino groups, can thereafter be converted to stable, novel quaternary polymers which show utility as mordants, silver halide peptizers, sensitizers, and antistatic agents.

This new class of polymers can be broadly described as synthetic polymers containing repeating units selected from the group consisting of vinyloxymethylamine units and quaternary salts of vinyloxymethylamine units, the amino groups being tertiary amino groups. Especially useful polymers of this invention are synthetic polymers containing repeating units having the following general formula:

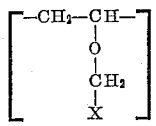

wherein X is selected from the group consisting of:

(a) 

wherein $R_1$ and $R_2$ each represents an alkyl group having 1 to 8 carbon atoms, such as methyl, propyl, amyl, hexyl or octyl, or an aryl group, such as phenyl, and $R_1$ and $R_2$, taken together, represent the atoms, such as C, N, O, or S, necessary to complete a heterocyclic ring composed of 5 to 6 atoms;

(b) 

wherein $R_1$ and $R_2$ have the same meaning given above; $R_3$ represents a substituent selected from the group consisting of alkyl groups of 1 to 6 carbon atoms, and aralkyl groups, such as benzyl; and, D represents an acid anion, such as p-toluene sulfonate, or halide, such as bromide or iodide; and, (c) 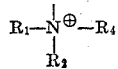

wherein $R_1$ and $R_2$ have the same meaning given above, and $R_4$ is selected from the group consisting of —$CH_2CH_2CH_2SO_3^\ominus$ and —$CH_2CH_2CH_2CH_2SO_3^\ominus$. This description will be further illustrated in the following equations showing the chemical reactions which may be employed in producing the products of this invention.

Polyvinyl alcohol is reacted with an alkoxymethylamine as follows:

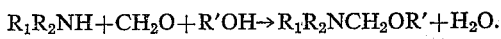

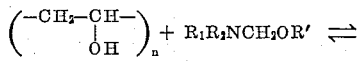

wherein $R_1$ and $R_2$ represent alkyl radicals having from 1 to 8 carbon atoms, aryl groups such as phenyl and naphthyl, and $R_1$ and $R_2$, taken together, represent the atoms such as C, N, O or S, necessary to complete a heterocyclic ring composed of 5 to 6 atoms, and $n$ is a whole number. Advantageously, R' in the above formula is a small alkyl group so that R'OH may be distilled, thus driving the reaction to completion. Since an equilibrium exists, as depicted in the foregoing equation, these amino polymers are readily converted to polyvinyl alcohol when dissolved in an alcohol such as methanol. Thus, an amino polymer of this invention can be readily prepared in a solvent such as dioxane to obtain a smooth dope and, upon the addition of methanol just prior to extrusion or casting, a fiber or a film of polyvinyl alcohol can be obtained. The starting alkoxymethylamine may be recovered and may be reacted with more polyvinyl alcohol. In addition to this advantageous property, the amino polymers of this invention are, of course, intermediates for the final quaternization products as will now be described.

The polymers resulting from the polyvinyl alcohol-alkoxymethylamine reaction may be quaternized according to this invention by reagents such as alkyl p-toluenesulfonates, dialkyl sulfates, alkyl halides, propane sultone, butane sultone or the like such, as follows, as in the case of methyl para-toluenesulfonate.

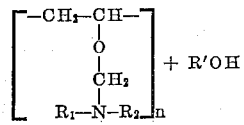

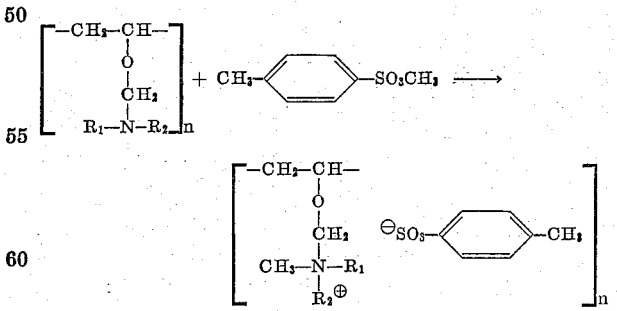

As will be appreciated, if other quaternizing reagents are employed, such as methyl iodide or bromide for example or one of those reagents previously mentioned, various quaternized products coming within the above general formula are obtained. The quaternized polymers of this invention are hydrophilic.

The following examples illustrate the nature of the present invention; however, the invention is not intended to be limited to or by said examples.

*Example 1.—Quaternary ammonium salts of poly(N,N-disubstituted vinyloxymethylamines) and methyl p-toluenesulfonate*

Eleven grams (0.25 mole) of dry polyvinyl alcohol was added, while stirring, to 300 ml. of anhydrous dioxane and to this stirred mixture was added 0.25 mole of ethoxymethylamine. The resultant stirred reaction mixture was then refluxed in a distillation flask from which the ethanol was distilled. As the reaction proceeded, the insoluble polyvinyl alcohol was converted to the soluble polyvinyloxymethylamine. The resulting thick solution, or dope, was filtered through a felt pad to remove any unreacted material, following which 50 grams of methyl p-toluenesulfonate was added to the polyvinyloxymethylamine solution and the resultant solution was rotated under vacuum at room temperature for about 18 hours. Methanol was then added in sufficient quantity to dissolve the product and the dissolved quaternary polymer isolated by precipitation in ether. The white, soft polymer was dried in vacuum to yield a brittle foam.

*Example 2.—Poly(N-vinyloxymethyl-N,N-dimethylanilinium p-toluene sulfonate)*

In a manner similar to that described in Example 1, eleven grams of dry polyvinyl alcohol was refluxed in 300 ml. of anhydrous dioxane and 60 g. of N-ethoxymethyl-N-methylaniline. The ethanol formed was removed by distillation and the resultant thick solution of poly(N-vinyloxymethyl - N - methylaniline) was filtered through a felt pad and precipitated in ether. This precipitate was dried in vacuum to yield 27 grams of a tough, colorless, elastic polymer.

Upon treatment of this precipitate with methyl p-toluene sulfonate, again following the procedure set forth in Example 1, a white, colorless polymer was obtained which possessed the following unit:

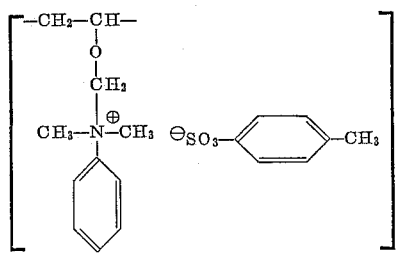

*Example 3.—Poly(N-vinyloxymethyl-N-methylmorpholinium p-toluene sulfonate)*

Twenty-two grams of dry polyvinyl alcohol was heated, with stirring, in a 150° C. oil bath with 500 ml. of dioxane and 75 ml. of N-ethoxymethylmorpholine. The dioxane-ethanol distillate was removed until a smooth dope was obtained. After cooling the reaction mixture to 40° C., 100 ml. of methyl p-toluenesulfonate was added, and after 2 hours the quaternized polymer began to separate. After 24 hours the polymer was dissolved in methanol and precipitated in a 1:1 mixture of ether: acetone. After re-dissolving in methanol, it was filtered and precipitated in ether. The dry, water-soluble polymer (113 grams) contained 3.3% nitrogen and 8.6% sulfur and has the following predominant structural unit:

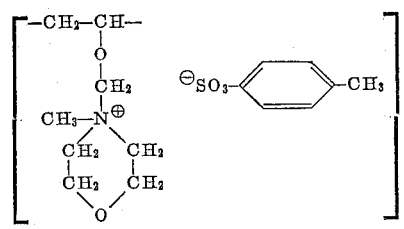

*Example 4.—Poly(N-vinyloxymethylpiperidine) quaternized with propane sultone*

Following the procedure set forth in Example 1, but using N-ethoxymethylpiperidine instead of N - ethoxymethylmorpholine, and 1,3-propane sultone as the quaternizing agent, the resulting quaternized polymer was triturated in acetone to give a finely divided, crumbly product. It was insoluble in methanol but soluble in water. The predominant structural unit is:

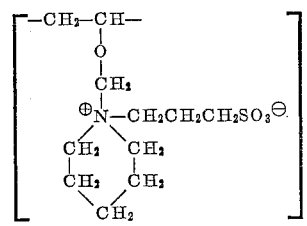

*Example 5.—Poly(N-vinyloxymethyl-N-methylpiperidinium methyl sulfate)*

In a manner similar to that described in Example 4, dimethyl sulfate was used as the quaternizing agent. A hygroscopic, water-soluble polymer was obtained having the predominating unit

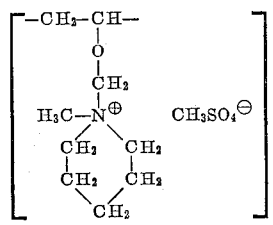

*Example 6.—Poly(N-vinyloxymethyl-N-methylpiperidinium halides)*

The procedure of Example 4 was followed except that methyl bromide was employed as the quaternizing agent. In a similar example, methyl iodide was used as the quaternizing agent. The polymers obtained had the same repeating unit as that shown in Example 5 except that the anions were bromide and iodide, respectively.

In some instances, it may be desirable to employ as the starting material a polyvinyl alcohol which has not been completely hydrolyzed, i.e., a copolymer of vinyl alcohol and vinil acetate. If desired, the acyl groups of the copolymer may be removed after converting part or all of the vinyl alcohol units to vinyloxymethylamine (or the quaternary salt) repeating units as shown in Example 7.

*Example 7*

Following the procedure of Example 3, 27 grams of a copolymer of vinyl alcohol and vinyl acetate containing 76–79 mole percent vinyl alcohol, was reacted with 55.8 grams of N-ethoxymethylmorpholine in 500 ml. of dioxane. The polymer was quaternized as described in Example 3, isolated and dissolved in 500 ml. of methanol containing 5 g. of dry HCl. After four days at room temperature, the polymer was precipitated in a 2:1 acetone: ether mixture. Infrared analysis showed loss of the acetyl groups. The polymer contained 3.3% nitrogen and 8.1% sulfur.

Using the procedure described in Examyle 1, the following quaternized polyvinyloxymethylamines were prepared:

Poly(N-vinyloxymethyl-N-methylpiperidinium p-toluenesulfonate)

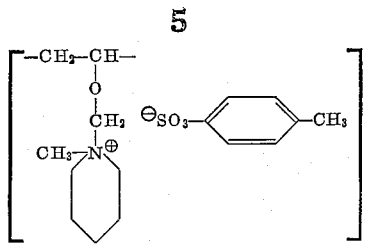

Poly(N - vinyloxymethyl-N,N-diethyl-N-methylammonium p-toluenesulfonate)

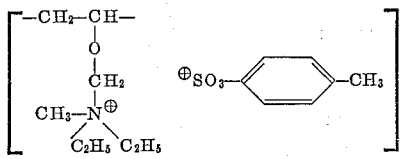

Poly(N-vinyloxymethyl - N,N - dibutyl-N-methylammonium p-toluenesulfonate)

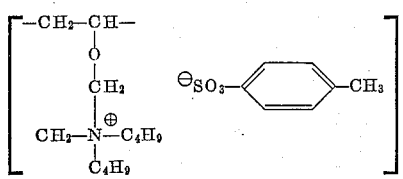

Poly(1-methyl-1-vinyloxymethyl - 4,4 - dimethylpiperazinium bis p-toluenesulfonate)

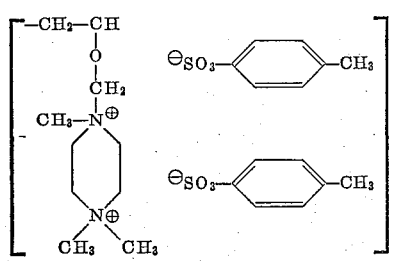

Poly(N - vinyloxymethyl-N-cyclohexyl-N,N-dimethylammonium p-toluenesulfonate)

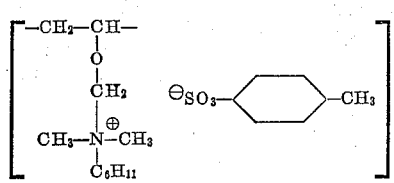

As noted above, soluble polymers containing vinyloxymethylamine repeating units in accordance with the invention are readily converted into insoluble polymers by treatment with an alcohol. Thus, solvent solutions of the polymers of the invention may be prepared, an alcohol added and the solution may then be formed into a useful structure, such as by casting the solution onto a smooth surface to form a film, or extruding through an orifice to form a filament or fiber. Preferably, the alcohol is added just prior to forming the solution into the desired structure. This aspect of the invention is demonstrated in Example 8, and the mechanism of the reaction is illustrated below:

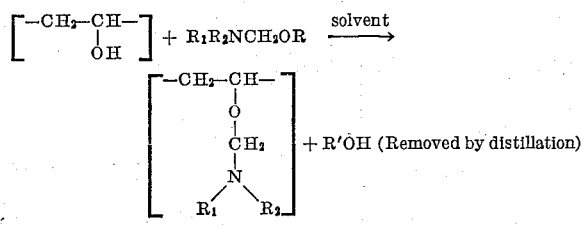

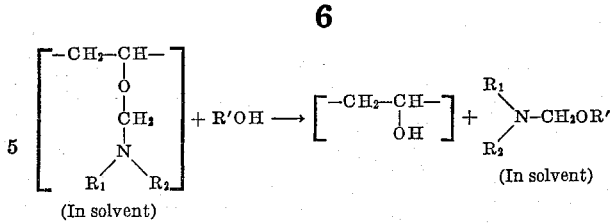

In the above formula, R′ represents a lower alkyl group of 1 to 5 carbon atoms, preferably methyl or ethyl, and $R_1$ and $R_2$ have the meanings given above.

*Example 8*

A solution of polyvinyloxymethylamine in dioxane was prepared as described in Example 1. To this solution was added an excess of methanol, and the solution was immediately cast on a smooth surface. A film of polyvinyl alcohol was obtained. A fiber of polyvinyl alcohol was formed in a similar manner by extruding the solution, just after the addition of methanol, through a small orifice.

The polymers in accordance with this invention include homopolymers containing only the repeating units defined above, and copolymers featuring those repeating units and also containing one or more other copolymerizable repeating units, such as those having the formula:

$$\left[\begin{array}{cc} A & D \\ | & | \\ -C-C- \\ | & | \\ B & E \end{array}\right]$$

wherein two or more of A, B, D and E represent hydrogen, and the remainder, if any, represent substituents such as alkyl, aryl, acyloxy, cyano, halogen, diacylimido, alkoxy, aryloxy, carbalkoxy, carbamyl, and the like.

Advantageously, the polymers of the invention are prepared by reacting a synthetic polymer containing free and reactive hydroxyl groups with an alkoxymethylamine (wherein the alkoxy group preferably contains from 1 to 5 carbon atoms). The quaternary salts of these polymers may be formed with any suitable quaternizing agent. Preferably, the starting material is a polymer containing vinyl alcohol repeating units. Although many starting materials may be employed with good results, especially useful polymers are those obtained when the starting material is a polyvinyl alcohol (which may contain minor proportions of vinyl acetate) having an inherent viscosity of about .1 to .6 in water at 25° C. (the inherent viscosity being 2.303 times $\log_{10}$ of the relative viscosity divided by the concentration, and the relative viscosity is determined by dividing the flow time of the solution by the flow time of the solvent using a concentration of 0.250 g. of the compound diluted to 100 ml. with water).

The invention has been described in detail with particular reference to preferred embodiments thereof, but it will be understood that variations and modifications can be effected within the spirit and scope of the invention as described hereinabove and as defined in the appended claims.

I claim:

1. As a new composition, a synthetic, hydrophilic polymer containing repeating units having the general formula:

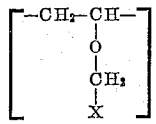

wherein X is selected from the group consisting of:

(a)

$$R_1-N-R_2$$

wherein $R_1$ and $R_2$ each represent a substituent selected from the group consisting of alkyl radicals having 1 to 8 carbon atoms, and an aryl group, and $R_1$ and $R_2$, taken together, represent the atoms necessary to complete a heterocyclic ring composed of 5 to 6 atoms;

(b) 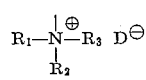

wherein $R_1$ and $R_2$ have the same meaning given above; $R_3$ represents a substituent selected from the group consisting of alkyl groups of 1 to 6 carbon atoms, and an aralkyl group; and D represents an acid anion; and (c) 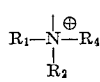

wherein $R_1$ and $R_2$ have the same meaning given above, and $R_4$ is selected from the group consisting of —$CH_2CH_2CH_2SO_3^{\ominus}$ and —$CH_2CH_2CH_2CH_2SO_3^{\ominus}$.

2. Poly(N-vinyloxymethyl-N-methylaniline).
3. Quaternary salts of poly(N-vinyloxymethyl-N-methylaniline).
4. Poly(N-vinyloxymethylmorpholine).
5. Quaternary salts of poly(N-vinyloxymethylmorpholine).
6. Poly(N-vinyloxymethyl - N - methylmorpholinium p-toluenesulfonate).
7. Poly(N-vinyloxymethylpiperidine).
8. Quaternary salts of poly(N-vinyloxymethylpiperidine).
9. Poly(N - vinyloxymethyl-N-cyclohexyl-N,N-dimethylammonium p-toluenesulfonate).
10. The method of forming shaped structures which comprises (a) forming an organic solvent solution of a polymer containing repeating units having the following formula:

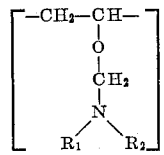

wherein $R_1$ and $R_2$ each represhent a substituent selected from the group consisting of alkyl radicals having from 1 to 8 carbon atoms and aryl groups, and $R_1$ and $R_2$, taken together, represent the atoms necessary to complete a heterocyclic ring composed of 5 to 6 atoms; (b) adding a lower alkanol to the solution to convert said repeating units to vinyl alcohol units; and (c) forming said solution into a shaped structure substantially immediately after the addition to the solution of the alkanol.

11. As a new composition, the synthetic hydrophilic polymer containing repeating units selected from the group consisting of vinyloxymethylamine units having the following formula:

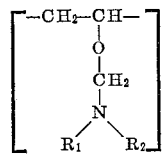

wherein $R_1$ and $R_2$ each represent a substituent selected from the group consisting of alkyl radicals having from 1 to 8 carbon atoms and aryl groups, and $R_1$ and $R_2$, taken together, represent the atoms necessary to complete a heterocyclic ring composed of 5 to 6 atoms; and, quaternary salts of said vinyloxymethylamine units.

12. A process for the production of novel hydrophilic amino polymers which comprises reacting a N,N-di-substituted alkoxymethylamine with polyvinyl alcohol and removing the resultant amino polymer, each of said substituents on said nitrogen atom being selected from the group consisting of alkyl radicals having from 1 to 8 carbon atoms, aryl groups and, taken together, the atoms necessary to complete a heterocyclic ring composed of 5 to 6 atoms.

13. The process as defined in claim 12 plus the further step of reacting the resultant amino polymer of claim 12 with a quaternizing agent, and recovering the resultant quaternized product.

14. As a new composition, a synthetic hydrophilic polymer containing vinyloxymethylamine units having the following formula:

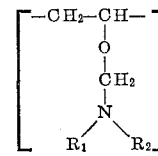

wherein $R_1$ and $R_2$ each represent a substituent selected from the group consisting of alkyl radicals having from 1 to 8 carbon atoms and aryl groups, and $R_1$ and $R_2$, taken together, represent the atoms necessary to complete a heterocyclic ring composed of 5 to 6 atoms.

15. As a new composition, a synthetic hydrophilic polymer containing repeating units having the general formula:

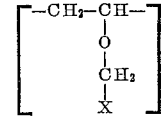

wherein X is selected from the group consisting of:

(a) 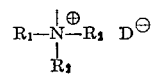

wherein $R_1$ and $R_2$ each represent a substituent selected from the group consisting of alkyl radicals having from 1 to 8 carbon atoms and aryl groups, and $R_1$ and $R_2$, taken together, represent the atoms necessary to complete a heterocyclic ring composed of 5 to 6 atoms; $R_3$ represents a substituent selected from the group consisting of alkyl groups of 1 to 6 carbon atoms, and an aralkyl group; and, D represents an acid anion; and (b) 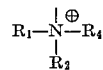

wherein $R_1$ and $R_2$ have the same meaning given above, and $R_4$ is selected from the group consisting of

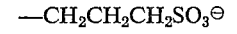
and
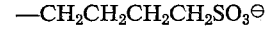

16. The process of forming a shaped structure essentially consisting of a polyvinyl alcohol which comprises forming a solution of a polymer containing vinyloxymethylamine repeating units in dioxane, said repeating units having the following formula:

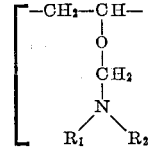

wherein $R_1$ and $R_2$ each represent a substituent selected from the group consisting of alkyl radicals having from 1 to 8 carbon atoms and aryl groups, and $R_1$ and $R_2$, taken together, represent the atoms necessary to complete a heterocyclic ring composed of 5 to 6 atoms; adding methanol to said solution in a quantity sufficient to effectively convert substantially all of said vinyloxymethylamine units in said polymer to vinyl alcohol units, and forming said solution into a shaped structure substantially immediately after the addition of methanol to said solution.

References Cited

UNITED STATES PATENTS 2,734,890   2/1956   Bortnick et al. _ _ _ _ _ _ 260—91.3

JOSEPH L. SCHOFER, *Primary Examiner.*

D. K. DENENBERG, *Assistant Examiner.*